April 27, 1965  R. M. NESTER  3,180,610
VALVE
Filed April 5, 1962
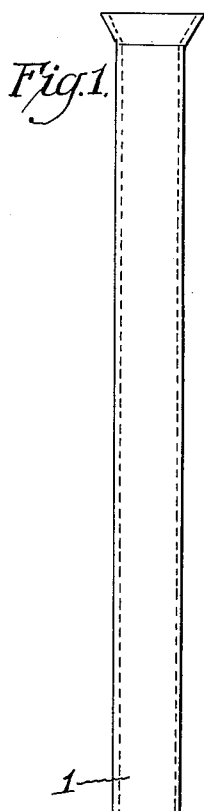
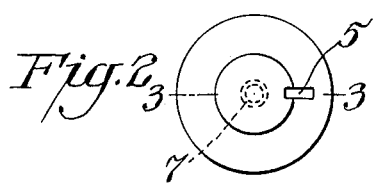
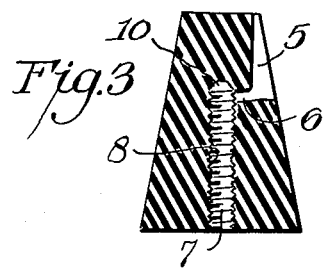
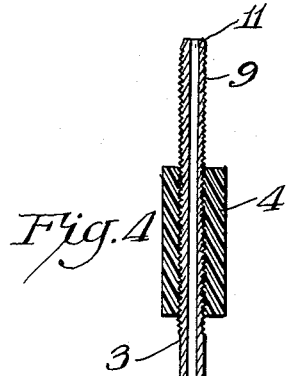
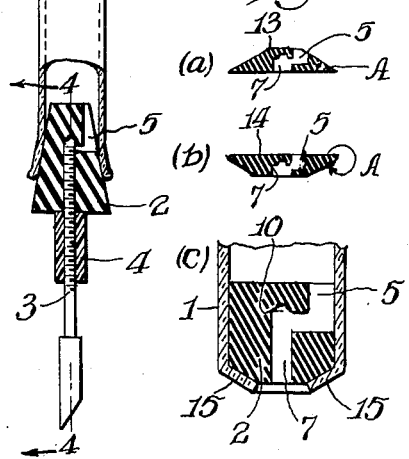
Inventor
Ralph M. Nester
By C. H. Mortenson
Attorney

United States Patent Office 3,180,610
Patented Apr. 27, 1965

3,180,610
VALVE
Ralph M. Nester, Newark, Del., assignor to Nester & Faust Manufacturing Corp., a corporation of Delaware
Filed Apr. 5, 1962, Ser. No. 185,433
7 Claims. (Cl. 251—150)

This invention relates to a new valve structure. More particularly, it relates to a new device for metering out fluids which device is constructed of a synthetic polymer of the fluorocarbon type.

There are a great many applications in which small amounts of fluids are required to be transferred from one chamber to another. One example that will be used for purposes of discussion and description in this invention is the common burette found in the chemical laboratory. For many years the common valve or stopcock has been used despite its well-known short-comings. One of these is the necessity to grease the stopcock in order to make a seal and in order to provide for the turning of the stopcock. Despite the greased nature of this particular valve, sticking or freezing of such stopcocks is a common occurrence even during its use and on standing out of use such freezing occurs. Further, a broken or damaged stopcock generally leaves the burette useless. Perhaps the most serious disadvantage of this type of a valve lies in the fact that it is very difficult to regulate the passage of small drops from the burette to the container desired. The operator must deftly turn the stopcock in order to get the right opening of the bore exposed to the fluid above it. This is a very difficult thing to do when the operator has to contend with a valve that is difficult to turn and a valve which does not allow him to gauge how much is coming out until the fluid is actually coming out of the burette. Accordingly, there has been long felt a need for improvement in valves for such laboratory equipment such as burettes, separatory funnels and the like.

An object of this invention is the provision of a valve which presents a boring through which can be passed minute amounts of liquid upon the slight and easily made adjustment of a valve stem. Another purpose of this invention is to provide a valve which presents a minimum of exposure of the moving part forming the seal to the fluid which is to pass through the valve. A still further aim is the provision of a valve made of chemically inert materials. Another object is the providing of a closing and opening means in the valve which is positively acting and which is substantially free of the possibility of jamming. These and other objectives will appear hereinafter.

The purposes of this invention are accomplished by the provision of a valve which is made of a fluorocarbon resin such as poly(tetrafluoroethylene). The valve comprises, in the main, two parts these being a plug or stopper made of the said fluorocarbon resin and having a passageway through it from one end of it to another and in conduit relationship therewith a movable part, which may be constructed also of the said fluorocarbon resin if desired, this part, preferably being threaded on the outside to mesh with the threaded portion of a passageway in the said stopper. Thus, the moveable member may be threaded into the threaded bore of the plug until it can go in no further; this will close the passageway and prevent fluid from passing through the valve, since the opening to the moveable part is closed by the plug. Upon partially withdrawing the moveable member from the stopper by slight unthreading, the operator can effect the flow of fluid through the valve as desired. This invention will be further understood by reference to the description below and to the figures, which are given by way of illustration and are not limitative, the figures being as follows:

FIGURE 1 is a side elevation, partly in section, showing the valve structure of this invention in the closed position;

FIGURE 2 is an enlarged plan view of the stopper or the plug portion of the valve of this invention;

FIGURE 3 is a sectional view taken on line 3—3 of FIGURE 2;

FIGURE 4, taken on line 4—4 of FIGURE 1, is a sectional elevation of several elements in an assembled relationship but detached from the structure illustrated in FIGURE 3;

FIGURE 5 is a further enlarged detail of the several assembled elements of this invention comprising the valve structure and showing the valve in an open position; and FIGURE 6 (a), (b) and (c) illustrate various tapered plugs that can be used.

As shown in FIGURE 1, the burette 1 is sealed at its lower end with the stopper 2 in which is positioned the threaded valve stem 3. The plug 2 is constructed of a fluorocarbon resin, such as poly(tetrafluoroethylene), but it may be made of a wide variety of materials including copolymers of tetrafluoroethylene with other monomers such as monochlorotrifluoroethylene and hexafluoropropylene. However, in view of the chemical inertness and the stability of poly(tetrafluoroethylene) it is preferred by far as the material for the stopper part of the valve of this invention. The moving, threaded element 3 is a piece of tubing made from such synthetic polymers as those named above or from a large variety of metals including stainless steel, brass, copper, aluminum and the like. Usually an inactive chemically stable material is chosen such as poly(tetrafluoroethylene) or copper. This moving element has positioned around it sleeve 4 which is made of rubber, polyethylene or any similar device and which serves merely as a gripping means for which to turn the moving element 3. This sleeve 4 will slide up or down the moving element with ease.

As noted in FIGURE 1 and better in FIGURE 3 or FIGURE 5, the plug 2 has conduit 5 cut down its side for a portion of its length from the top extending toward the bottom and then cut inwardly at 6 to join the conduit 7 which extends from the bottom of the plug upwardly through the center part of the plug and a bit beyond the bottommost part of conduit 5. The stopper 2 that is shown in the figures is conical in construction and the conduit 5 can be seen in FIGURE 2 extending down the sides of the frustum. The upwardly extending conduit 7 is shown in dotted lines in FIGURE 2.

The threads 8 on the inside of stopper 2 are carefully machined, and they mesh with a snug fit yet easily with the outside threads 9 of valve stem or moving element 3. These threads, both the inside threads 8 and the outer threads 9, need never be exposed to the fluid passing through the valve, for the operator in varying the amount of the flow of the fluid from the closed position shown in FIGURE 1 need remove the moving element 3 no more than to the position of that element shown in FIGURE 5 which is a completely open position. Yet, the moving element 3 may be very easily completely removed from the stationary element 2, if desired. If desired moving element 3 and inner surfaces of the bore 7 may be smooth walled, the element 3 being slideably positioned in the conduit by snug fittings. Generally, however, the threaded modification is preferred for the adjustments are fine and precise and very easily made.

As will be noted in FIGURE 5, the internal, vertical bore 7 terminates in a frustum-shaped manner shown at 10 in FIGURE 5. Similarly, the moving element 3 at its upper end terminates in a frustum-shaped manner shown at 11 in FIGURE 5. Upon screwing the element 3 completely into the stopper 2 the surfaces or edges of element 3 at 11 enter snugly and tightly into the surfaces of the frustum-shaped end of tube 7 at 10. A tight and positive seal results which precludes the passage of any fluid from the burette when the valve stem 3 is in the closed position as shown in FIGURE 1. Further, the dove-tailed effect that is obtained prevents element 3 from cutting into the polymer in stopper 2 above element 3. When tube 3 terminates in a cylindrical cross-section such cutting can occur especially when tube 3 is made of a metal. Therefore, the frustum-shaped end or similar blunt endings are preferred.

The angles of the frustum shapes in stopper 2 can vary from 5° to 185°. As can be seen in FIGURE 6(a) the angle A of the plug can be very small with edge or surface 13 being within the container while in FIGURE 6(b) the angle A is very large, the edge or surface 14 being within the container. In these instances the walls 15 of the container will curve inwardly in the freeze fitting of the plug as shown in FIGURE 6(c). This latter figure shows a combination of straight and tapered walls. Any of various forms may be used including completely straight or vertical walls for the plugs are very tightly held in place by the adjacent container walls. The exceptionally tight seals of this invention are attained by heating the container walls prior to inserting the plug or by cooling the plug before insertion. In the one instance the walls will contract firmly gripping the plug. In the other the plug will expand producing the tight seal. By such procedures a seal known as a "freeze fit" is obtained. Further, the frustum shape can be used in an inverted form. That is, the base may be at the top with a smaller end extending below the container 1. Of course, the bore 7 will then extend upwardly from the short base toward the broader base. Still further, it will be appreciated that the stopper 2 may be octagonal, pentagonal or hexagonal in shape or in any shape that is desired to fit a given container. Thus, while the stopper 2 is shown in the shape of a frustum in the figures, it is to be understood that the valve of this invention is not limited to that shape. It will be further appreciated that the stopper irrespective of the number of sides it has can be straight walled or slanted outwardly or inwardly at such angles as those discussed above.

It will also be understood that the moveable element 3 is of any length desired. Similarly, the element may be bent or curved and it may have attached to it a moveable piece of plastic 12 shown in FIGURE 4.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. An article of manufacture being a plug and a valve for a container having an outlet which article comprises a piece of solid fluorocarbon resin having a shape and dimensions on its outside surfaces to conform to the inside shape and dimensions of said outlet affording thereby a plug for said outlet; inside said piece of resin three conduits, the first conduit being a threaded bore extending longitudinally from the bottom end of said plug almost to the opposite end, the second conduit being an unthreaded bore extending longitudinally from the top end to a point below the upper end of the first conduit, but not aligned with the said first conduit and the third conduit being an unthreaded bore extending transversely and connecting the first and the second conduits; and positioned in said first conduit a movable, hollow element having external threads meshable with said threads of said first conduit and being, depending upon its position, in passageway relationship with said first, second and third conduits and having a length longer than the length of said first conduit.

2. An article in accordance with claim 1 in which said first conduit terminates at its upper, innermost end in an end section that has a shape and dimensions conforming to the outer shape and dimensions of the inner end of said movable element positioned within it.

3. An article in accordance with claim 1 in which said plug is made of poly(tetrafluoroethylene).

4. An article in accordance with claim 1 which has been frozen into place in said outlet.

5. A precision metering device comprising a stationary element constructed of a fluorocarbon resin and adapted to be fitted into an open end of a burette-like tubular container, said stationary element containing an L-shaped channel which extends partially into said element and which opens into a second channel within said stationary element; vertically disposed relative to the said base of the L-shaped channel the said second channel which bears internal threads and has at its innermost end a frustum-like terminus; and in combination with said second channel and extending beyond said stationary element, a movable tubular element bearing external threads meshable with said internal threads and co-acting with the stationary element to seat snugly in said terminus and seal the said L-shaped channel.

6. A device in accordance with claim 5 in which said stationary element is made up of poly(tetrafluoroethylene).

7. A device in accordance with claim 5 which has been frozen into place in said outlet.

References Cited by the Examiner

UNITED STATES PATENTS

| | | | |
|---|---|---|---|
| 225,298 | 3/80 | Newton | 215—77 |
| 902,309 | 10/08 | MacWilliam | 251—346 X |
| 1,007,664 | 11/11 | Baker | 251—346 |
| 1,127,622 | 2/15 | Hitchcock | 251—346 |
| 2,083,156 | 6/37 | McCabe | 251—351 X |
| 2,865,596 | 12/58 | Monnig | 251—346 X |
| 2,925,989 | 2/60 | Hempel | 251—351 X |

M. CARY NELSON, *Primary Examiner.*